US012795613B2

(12) United States Patent
Arum et al.

(10) Patent No.: US 12,795,613 B2
(45) Date of Patent: Nov. 10, 2026

(54) METHOD FOR ALLOCATING A FREQUENCY RESOURCE TO AT LEAST ONE TERMINAL, AND ASSOCIATED DEVICE

(71) Applicant: Orange, Issy-les-Moulineaux (FR)

(72) Inventors: Steve Chukwuebuka Arum, Chatillon Cedex (FR); David Grace, Chatillon Cedex (FR); Paul Mitchell, Chatillon Cedex (FR); Laurent Reynaud, Chatillon Cedex (FR)

(73) Assignee: ORANGE, Issy-les-moulineaux (FR)

( * ) Notice: Subject to any disclaimer, the term of this patent is extended or adjusted under 35 U.S.C. 154(b) by 366 days.

(21) Appl. No.: 18/572,048

(22) PCT Filed: Jun. 10, 2022

(86) PCT No.: PCT/FR2022/051107

§ 371 (c)(1),
(2) Date: Dec. 19, 2023

(87) PCT Pub. No.: WO2022/269157

PCT Pub. Date: Dec. 29, 2022

(65) Prior Publication Data

US 2024/0298298 A1 Sep. 5, 2024

(30) Foreign Application Priority Data

Jun. 23, 2021 (FR) ....................................... 2106709

(51) Int. Cl.
*H04W 72/02* (2009.01)
*H04W 24/02* (2009.01)
(Continued)

(52) U.S. Cl.
CPC ........... *H04W 72/02* (2013.01); *H04W 24/02* (2013.01); *H04W 72/0453* (2013.01); *H04W 72/51* (2023.01)

(58) Field of Classification Search
CPC . H04W 72/02; H04W 24/02; H04W 72/0453; H04W 72/51
See application file for complete search history.

(56) References Cited

U.S. PATENT DOCUMENTS

2005/0086343 A1 4/2005 Chellis et al.
2008/0248803 A1 * 10/2008 Lee ..................... H04W 52/346 455/450

FOREIGN PATENT DOCUMENTS

EP 1186188 A1 3/2002
KR 102039650 B1 * 11/2019 ............. G06N 20/00
WO WO 2004/040848 A1 5/2004

OTHER PUBLICATIONS

International Search Report and Written Opinion dated Sep. 13, 2022 for Application No. PCT/FR2022/051107.

* cited by examiner

*Primary Examiner* — Derrick V Rose
(74) *Attorney, Agent, or Firm* — Knobbe, Martens, Olson & Bear, LLP

(57) ABSTRACT

A method is described for allocating a frequency resource, from a set E of frequency resources, to at least one terminal positioned in a region of a cell belonging to a cellular network. The method includes, after the terminal sends a request for allocation of a frequency resource, identifying the cell and the region which are associated with said at least one terminal, verifying the availability of at least one frequency resource in a table comprising values respectively associated with the resources of the set E, and if at least one frequency resource is available, executing a reinforcement
(Continued)

learning algorithm based on the value or values associated with said at least one available frequency resource, so as to select a resource for said at least one terminal.

11 Claims, 3 Drawing Sheets

(51) Int. Cl.
*H04W 72/0453* (2023.01)
*H04W 72/51* (2023.01)

[Fig. 1]
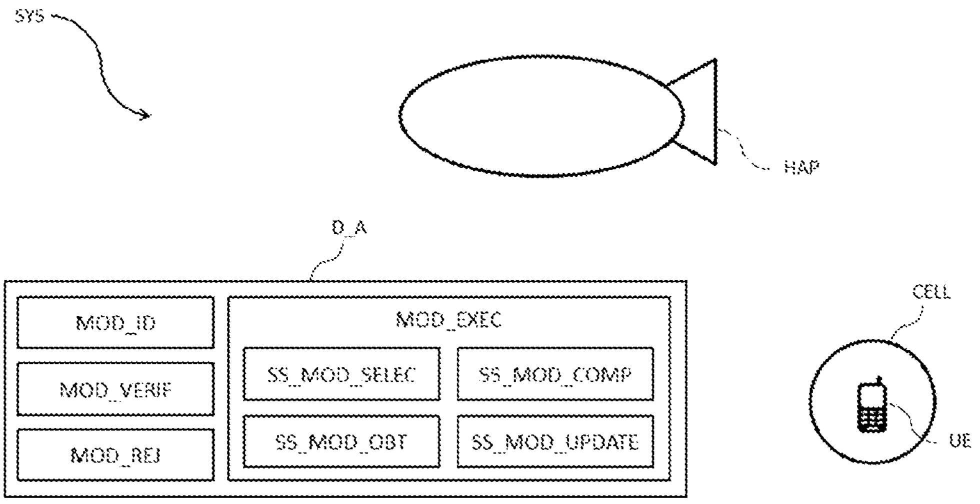
[Fig. 2]
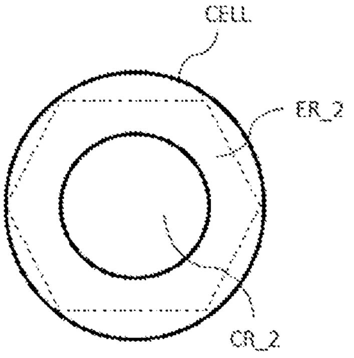
[Fig. 3]
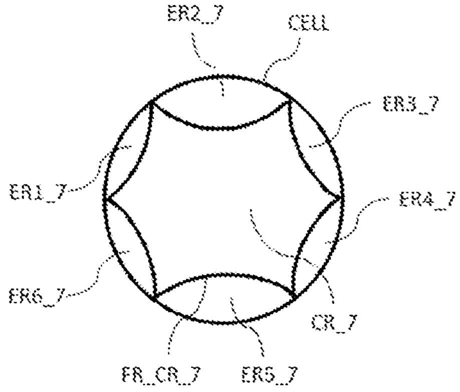

[Fig. 4]
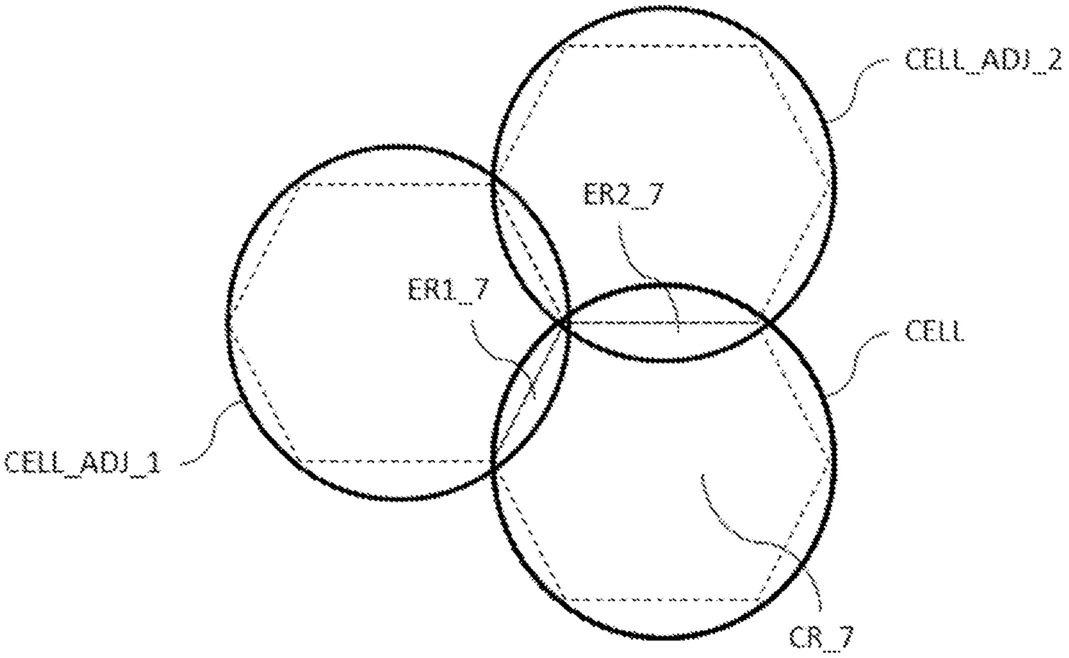
[Fig. 5]
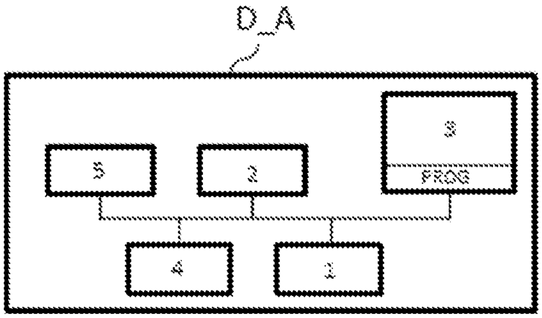

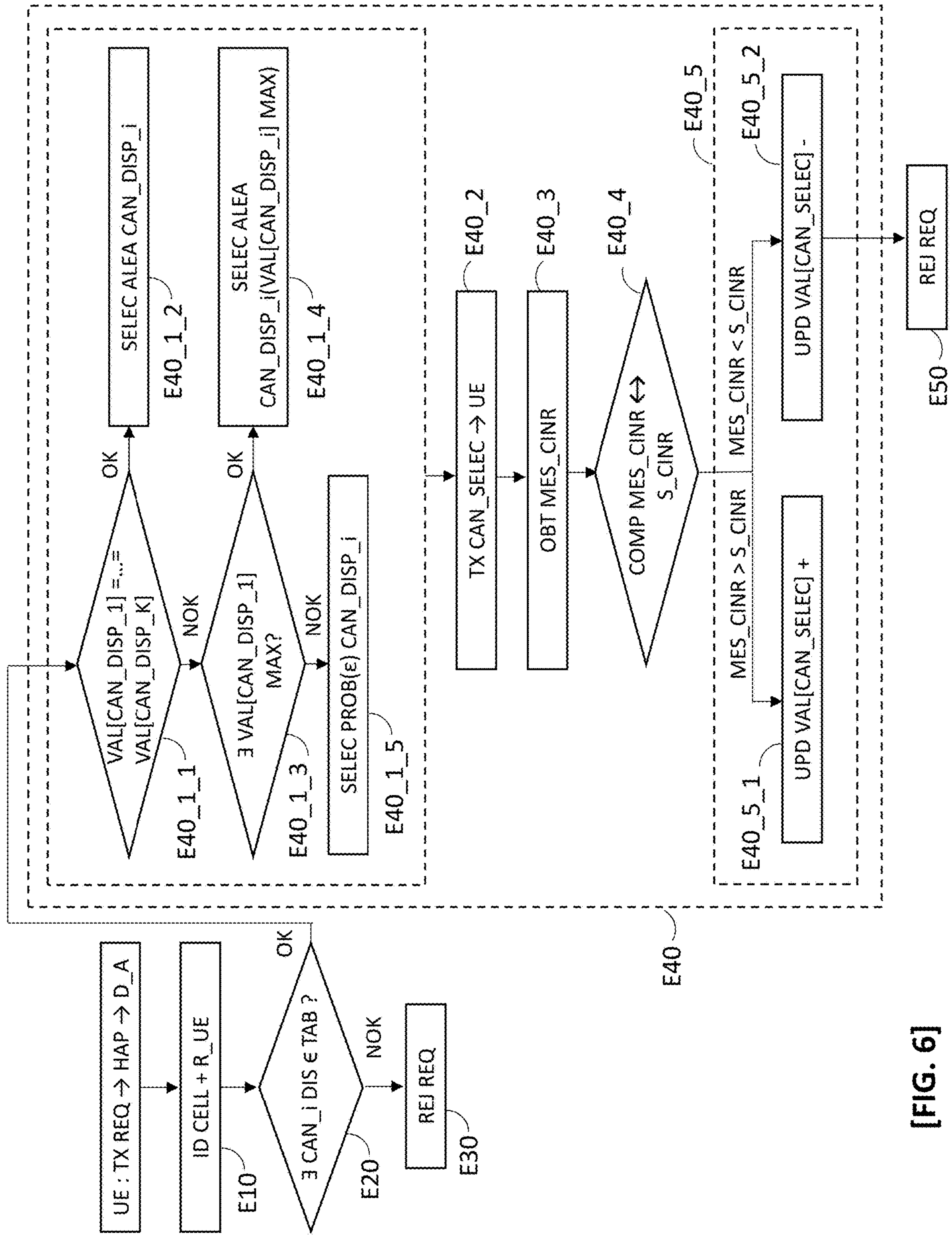
[FIG. 6]

METHOD FOR ALLOCATING A FREQUENCY RESOURCE TO AT LEAST ONE TERMINAL, AND ASSOCIATED DEVICE

RELATED APPLICATIONS

This application is the U.S. National Phase of Application No. PCT/FR2022/051107 entitled "METHOD FOR ALLOCATING A FREQUENCY RESOURCE TO AT LEAST ONE TERMINAL, AND ASSOCIATED DEVICE" and filed Jun. 10, 2022, which claims the benefit of French Patent Application No. 2106709, filed Jun. 23, 2021, each of which is incorporated by reference in its entirety.

DESCRIPTION OF RELATED TECHNOLOGY

The disclosed technology belongs to the general field of telecommunications, and more specifically to wireless communications implemented in cellular networks such as mobile networks (e.g. 3G, 4G, 5G, etc.), WiMAX, etc.

It more specifically relates to a method for allocating a frequency resource to at least one terminal positioned in a region of a cell belonging to a cellular network. It also relates to a device configured to implement said allocating method. The disclosed technology has an especially advantageous, though in no way limiting, application in the case of cellular networks, the cells of which are generated by a HAP (High Altitude Platform).

To adapt to the constant and increasingly rapid growth of traffic of data emitted by the wireless communications systems of cellular networks, different technologies are currently implemented, or undergoing enhancement with a view to optimal exploitation in the years to come. This is particularly important for the current deployment of 5G communication networks in which one must be able to serve a wide variety of devices, such as for example "smartphones" but also everyday objects made communicative to deliver IoT (Internet of Things) applications.

The term "cellular network" is conventionally understood to refer to a wireless communication network formed of a plurality of communication cells. Each cell corresponds to the radio coverage offered by an antenna able to transmit data via transmission beams, and can be represented theoretically on the ground in the form of a hexagon. Since the cells are mutually contiguous, the cellular network allows for a so-called "honeycomb" topology.

Note moreover that a cell can indistinguishably correspond to the radio coverage obtained using an antenna equipping a base station on the ground (said base station being also able to be equipped with a plurality of antennas), or else using an antenna equipping a non-terrestrial platform, such as for example a HAP platform, a drone, a satellite, etc. More specifically regarding HAP platforms, note that their deployment is at present the focus of particular attention insofar as it allows, in particular, the extension of access to radio resources in areas which are difficult to access by land. For more details concerning said HAP platforms, the following document can for example be consulted "Beam-Pointing Algorithm for Contiguous High-Altitude Platform Cell Formation for Extended Coverage". S. C. Arum, D. Grace, P. D. Mitchell, M. D. Zakaria, in Proceedings of the IEEE VTC-Fall, Honolulu, HI, USA, 22-25 Sep. 2019.

In practice, the technologies implemented to manage communications within a cellular network aim to strike a trade-off between:

optimization of the spectral efficiency, such as to provide a good quality of service to users (it being understood that a limited quantity of radio resources is accessible), and limitation of interference.

As regards the problem of interference within one and the same cell, it is traditionally overcome by resorting to specific signal processing techniques. One technique known for this purpose is the so-called "OFDMA" data encoding technique proposed by the 3GPP consortium (acronym of the expressions Orthogonal Frequency Division Multiple Access and Third Generation Partnership Project) and widely deployed at this time.

OFDMA encoding does not, however, make it possible to limit interference between adjacent cells, which is restrictive for users located at the cell edges. Complementary solutions have hence been proposed to attempt to respond to this more specific problem, among which is the group of solutions known as ICIC (Inter-Cell Interference Coordination).

ICIC techniques make it possible to impose access restrictions on the available radio resources, while achieving a high spectral efficiency. They thus rely on an intercellular signaling mechanism (i.e. messages exchanged between cells), and take advantage of the fact that the "cellular" structure of the network advantageously lends itself to the re-use (sharing), between different cells, of several frequencies coming from one and the same given set of frequencies (this set being also called "frequency band").

Thus, out of all the known ICIC techniques, the so-called FFR (Fractional Frequency Reuse) technique has been the one to receive considerable interest in the past few years. This FFR technique is based on the partitioning of a cell into two areas, a central area and a peripheral area. The central area is managed such as to have a re-use factor equal to 1 (i.e. all the frequencies of the frequency band are accessible). The peripheral area, meanwhile, is managed such as to have a re-use factor greater than 1 (i.e. only a fraction of the frequencies of the frequency band are accessible). Proceeding in this way makes it possible to limit interference at the cell edges insofar as the users positioned in two neighboring peripheral areas make communications over disjoint frequency spectra.

Although it seems to meet a large number of requirements desirable for the implementation of communications in a cellular network, the FFR technique nonetheless remains disadvantageous in some ways. Specifically, the re-use factor associated with an area (central or peripheral) of a cell remains fixed over time. What's more, within a peripheral area, only a clearly determined portion of the available frequency spectrum is intended to be constantly exploited. In other words, the management of the radio resources in a cell in accordance with the FFR technique obeys a previously established program, thus creating a particularly rigid operating framework. This results in an inability to adapt to a situation where this is variation in the number of users present in the different areas. Thus, by way of example, if a large number of users happens to be occupying a peripheral area of a cell for a long enough period, the portion of the frequency spectrum allocated to said peripheral area, which cannot be modified, may be insufficient to meet the communication requirements of these users.

SUMMARY

The disclosed technology has the aim of remedying all or part of the drawbacks of the prior art, particularly those described above, by making provision for a solution making it possible to obtain a very good trade-off between spectral efficiency and limitation of interference between adjacent cells of a cellular network, while offering very good ability to adapt to variations in the number of users in a peripheral area of a cell.

For this purpose, and according to a first aspect, the disclosed technology relates to a method for allocating a frequency resource to at least one terminal positioned in a region of a cell belonging to a cellular network, said cell being partitioned into a plurality of regions, a same set E of frequency resources being associated with each region of the cell. Furthermore, said method includes, following the transmission by said at least one terminal of a request for allocation of a frequency resource from among said set E, steps of:

- identifying the cell and the region associated with said at least one terminal,
- checking the availability of at least one frequency resource in a table listing said set E, associated with the cell and with the region identified, and comprising values respectively associated with the listed resources,
- if at least one frequency resource is available in said table, executing a reinforcement learning algorithm based on the value or values associated with said at least one available frequency resource, said execution including:
  - selecting a frequency resource from among said at least one available frequency resource,
  - obtaining a measurement of a determined quantity associated with said at least one terminal, said measurement being taken during a communication made by said at least one terminal using the selected frequency resource,
  - updating, by positive or negative reinforcement, the value associated with the selected frequency resource according to a result of a comparison between the obtained measurement and a given threshold, the allocation request being rejected in the event of a negative reinforcement or if no frequency resource is available.

Thus, the allocating method according to the disclosed technology is based firstly on the fact that the same set E of frequency resources is assigned to each of the regions of the cell. In particular, said set E may concern the entirety of the frequency spectrum offered by the radiating source or sources (e.g. high-altitude platform, base station, etc.) from which the cellular network originates. In other words, and contrary to the provisions of the prior art, it is not considered that certain portions of the frequency spectrum must be reserved for one or more regions while being excluded for yet other regions. Such provisions advantageously make it possible to keep great flexibility of use in the event of a marked variation in the number of users in a cell.

Of course, the fact of giving access to one and the same set E of frequency resources in each of the regions of a cell constitutes a potential restriction in terms of the trade-off between spectral efficiency and limitation of interference between adjacent cells. This difficulty is however judiciously overcome by the disclosed technology owing to the execution of the reinforcement learning algorithm.

Specifically, such an execution makes it possible to establish, for each region of the cell, a hierarchy (weighting) between the resources of the set E listed in the table assigned to said region. More specifically, each of the resources of the set E is associated with a digital value able to be updated by reinforcement (positive reinforcement, i.e. by increasing, or else negative reinforcement, i.e. by decreasing) according to whether or not a criterion of comparison to a quantity is satisfied.

Finally, the fact of executing the learning algorithm makes it possible to make a qualitative selection from among the available (i.e. not yet allocated) frequency resources, due to the values respectively associated therewith. In this way, the fact that the whole set E is accessible (at least theoretically) for a region is advantageously counterbalanced by the hierarchy created between the resources of the table of said region.

In particular methods of implementation, the allocating method may further include one or more of the following features, taken in isolation or according to any technically possible combination.

In particular methods of implementation, the reinforcement learning algorithm is a reinforcement Q-learning algorithm.

In particular methods of implementation, the cell to which said at least one terminal belongs is partitioned into two regions separated by a border defined as a level line of a determined quantity.

In particular methods of implementation, each cell of the cellular network includes six adjacent cells, the cell to which said at least one terminal belongs being partitioned into seven regions comprising a central region in contact with each of the other six regions, the border of said central region being defined as being a Voronoi curve parameterized by a determined quantity and characterized by the values taken by said quantity in relation to the cells adjacent to said cell to which said at least one terminal belongs.

In particular methods of implementation:

- the quantity relating to the measurement obtained during a communication made by said at least one terminal using the selected frequency resource is one from among: a carrier-to-noise ratio, a carrier-to-noise plus interference ratio, a power level indicator, a signal quality indicator, and
- the quantity above which a border is defined is one from among: a carrier-to-noise ratio, a carrier-to-noise plus interference ratio, a power level indicator, and a signal quality indicator.

In particular methods of implementation, the cellular network is generated by:

- a high-altitude platform, or
- a terrestrial mobile site, or
- a hybrid infrastructure including a non-terrestrial mobile site and a terrestrial mobile site.

More generally, the cellular network can be generated by at least one base station.

According to a second aspect, the disclosed technology relates to a computer program including instructions for implementing an allocating method according to the disclosed technology when said computer program is executed by a computer.

This program can use any programming language, and be in the form of source code, object code, or intermediate code between source code and object code, such as in a partially compiled form, or in any other desirable form.

According to a third aspect, the disclosed technology relates to an information or recording medium readable by a computer, on which is recorded a computer program according to the disclosed technology.

The information or recording medium can be any entity or device capable of storing the program. For example, the medium may include a storage means, such as a ROM, for example a CD-ROM or a microelectronic circuit ROM, or else a magnetic recording means, for example a hard disk.

In addition, the information or recording medium can be a transmissible medium such as an electrical or optical signal, which can be conveyed via an electrical or optical cable, by radio or by other means. The program according to the disclosed technology may in particular be downloaded over an Internet-type network.

Alternatively, the information or recording medium can be an integrated circuit into which the program is incorporated, the circuit being suitable for executing or being used in the execution of the method in question.

According to a fourth aspect, the disclosed technology relates to a device for allocating a frequency resource to at least one terminal positioned in a region of a cell belonging to a cellular network, said cell being partitioned into a plurality of regions, a same set E of frequency resources being associated with each region of the cell. Furthermore, said device includes:

- an identifying module configured to identify the cell and the region associated with said at least one terminal following the transmission by said at least one terminal of a request for allocation of a frequency resource from among said set E,
- a checking module configured to check the availability of at least one frequency resource in a table listing said set E, associated with the cell and with the region identified, and comprising values respectively associated with the listed resources,
- an executing module configured to execute, if at least one frequency resource is available in said table, a reinforcement learning algorithm based on the value or values associated with said at least one available frequency resource, said executing module including:
  - a selecting sub-module configured to select a frequency resource from among said at least one available frequency resource,
  - an obtaining sub-module configured to obtain a measurement of a determined quantity associated with said at least one terminal, said measurement being taken during a communication made by said at least one terminal using the selected frequency resource,
  - a comparing sub-module configured to compare the obtained measurement to a given threshold, such as to obtain a comparison result,
  - an updating sub-module configured to update, by positive or negative reinforcement, the value associated with the selected frequency resource according to the comparison result obtained,
- a rejecting module configured to reject the allocation request in the event of a negative reinforcement or if no frequency resource is available.

According to a fifth aspect, the disclosed technology relates to a wireless communication system including means configured to generate a cellular network, at least one terminal positioned in a region of a cell belonging to said cellular network as well as a device for allocating a frequency resource to said at least one terminal in accordance with the disclosed technology.

BRIEF DESCRIPTION OF THE DRAWINGS

Other features and advantages of this disclosed technology will become apparent from the description given below, with reference to the appended drawings which illustrate an exemplary embodiment thereof devoid of any limitation. In the figures:

FIG. 1 schematically represents, in its environment, a particular exemplary embodiment of a wireless communication system according to the disclosed technology;

FIG. 2 schematically represents an example of partitioning of a cell of a cellular network generated by a high-altitude platform belonging to the wireless communication system of FIG. 1;

FIG. 3 schematically represents another example of partitioning of a cell of a cellular network generated by a high-altitude platform belonging to the wireless communication system of FIG. 1;

FIG. 4 illustrates in more detail the partitioning principle of FIG. 3;

FIG. 5 schematically represents an example of a hardware architecture of an allocating device belonging to the wireless communication system of FIG. 1;

FIG. 6 shows, in the form of a flow chart, a particular method of implementation of an allocating method according to the disclosed technology as executed by the allocating device of FIG. 5.

DESCRIPTION OF THE EMBODIMENTS

FIG. 1 schematically represents, in its environment, a particular embodiment of a wireless communication system SYS according to the disclosed technology.

The wireless communication system SYS comprises means configured to generate (on the ground) a cellular wireless communication network (in other words, access to the cellular wireless network is achieved via said means). For the remainder of the description, it is considered without any limitation whatsoever that said cellular network is a mobile network of 5G type, and that the communications supported by this cellular network are made using a given set E of frequency resources.

For example, the system SYS may be configured to use a passband of 5 MHz, the carrier itself being set to 2 GHz and in which the set E includes 300 frequency resources each of 15 kHz (the passband of 5 MHz is partitioned into 25 resource units of 180 kHz each, each block containing 12 frequency resources of 15 kHz).

It should however be specified that the disclosed technology remains applicable to other types of mobile networks (for example 2G, 3G, 4G), WiMAX, etc. In general, no limitation is attached to the wireless communication network that can be considered in the context of this disclosed technology as long as this network is a cellular network.

It should be noted that in general, in this description, a "set of frequency resources" may include one or more frequency resources.

Note moreover that the expression "frequency resource" may be referred to by other names, such as for example "sub-channel" in the context of cellular networks as defined by the 3GPP consortium and based on the OFDMA data encoding technique.

In this embodiment, said means configured to generate the cellular network correspond to a high-altitude platform HAP taking the form of an aircraft of dirigible type positioned in the stratosphere at an altitude between 17 km and 22 km. Of course, nothing prevents the envisioning of a high-altitude platform rather than a dirigible, such as for example an aircraft, a drone etc. Nor does it rule out the possibility of the aircraft to be positioned at an altitude above 22 km.

Conventionally, said high-altitude platform HAP is equipped with an antenna. This antenna is formed of a plurality of elementary antennas organized in an antenna array and configured to transmit data by means of transmission beams. The cells of the cellular network are thus generated by means of said transmission beams and are separate from one another in accordance with a radiation diagram specific to the antenna equipping the high-altitude platform HAP. The shape and size of the cells on the ground are therefore determined by the characteristics of the antenna, but also by an angle of elevation evaluated with respect to a horizontal plane in which the antenna extends (when the angle of elevation decreases, the cells become larger with increasing overlap between them). Ideally, each antenna beam provides a uniform illumination to one cell of the cellular network.

It should be noted that the fact of considering a high-altitude platform HAP as means configured to generate a cellular network constitutes only one variant implementation of the disclosed technology. Also, nothing prevents the envisioning of embodiments in which other means are used, such as for example:

- a terrestrial mobile site, typically equipped with one or more base stations, or
- an infrastructure including at least one terrestrial mobile site and at least one non-terrestrial mobile site (e.g. a high-altitude platform HAP). This case is referred to as so-called "hybrid deployment" mode.

In a manner known per se, a cell belonging to the cellular network can conventionally be represented abstractly in the form of a hexagon. In this way, the cellular network has a so-called "Honeycomb" structure, each cell having six adjacent cells.

Note that if the hexagonal shape is a known abstract representation of a cell, said cell can also be represented in another shape substantially similar to that of a disc. More specifically, such a disc is configured such that its border forms a circle circumscribed in the concerned hexagon. It is nonetheless important to observe that such a circular representation of a cell remains theoretical insofar as it pertains primarily to assumptions related to the conditions of propagation of radio signals (no obstacles liable to cause reflections, diffractions etc.)

Conventionally, the circular border of a cell is defined as a function (corresponding to a level line) of a quantity characteristic of the attenuation of a radio signal between a first point (place of measurement of said quantity) of the cell and a second point substantially central within the cell. In this embodiment, this second point typically corresponds to the nadir in relation to the antenna element belonging to the high-altitude platform HAP and responsible for the generation of the cell (note that in the case of an implementation via base station(s), said second point corresponds to the location of the base station of the cell).

For example, said quantity may correspond to a carrier-to-noise ratio, also called a CNR (Carrier-to-Noise Ratio) or else C/N.

According to another example, said quantity may correspond to a signal-to-interference plus noise ratio, also known as CINR (Carrier to Interference plus Noise Ratio).

However, nothing prevents the envisioning of yet other quantities, such as for example a power level indicator of RSSI (Received Signal Strength Indicator) or RSRP (Reference Signal Received Power) type, a signal quality indicator of RSRQ (Reference Signal Received Quality) type, etc.

In general, the aspects related to the generation of a cellular network and also to the shape of the cells of this network are well-known to those skilled in the art, and will consequently not be further detailed here.

Note also that, within the meaning of this disclosed technology, no limitation is attached to the extent of the radio coverage associated with a cell of the cellular network. Consequently, a cell of the cellular network may be a macro-cell, or a pico-cell, etc.

As illustrated by FIG. 1, the wireless communication system SYS also includes a user terminal UE attached to (and thus served by) the high-altitude platform HAP and positioned in a cell CELL of the cellular network. The cell CELL is shown in FIG. 1 in which it takes the theoretical circular shape described hereinabove.

More specifically, the case considered here without any limitation whatsoever is that in which a single user terminal is taken into account in the wireless communication system SYS. It is however important to note that the fact of considering only a single user terminal has the sole aim of simplifying the description of the disclosed technology. The disclosed technology still remains applicable for a plurality of user terminals present in one and the same cell, or else distributed (not necessarily uniformly) within a plurality of cellular network cells.

The terminal UE corresponds for example to a cell phone, for example of smartphone type, a touch-sensitive tablet, an electronic personal assistant, a personal computer, etc. In general, no limitation is attached to the nature of said terminal UE.

The terminal UE is particularly configured in a manner known per se such as to be able to perform processing allowing it to transmit to the high-altitude platform 11 (or to another device, the so-called "allocating device" D_A, belonging to the communication system SYS and described hereinafter) a request for allocation of a frequency resource from among the set E and also to exchange data (and therefore communicate) with, in particular, the high-altitude platform HAP and said allocating device D_A, by implementing a communication method.

For this purpose, the terminal UE for example includes one or more processors and memory storage means (magnetic hard disk, electronic memory, optical disk etc.) in which are memorized data and a computer program, in the form of a set of program code instructions to be executed to implement said communication method.

Alternatively or additionally, the terminal UE also includes one or more programmable logic circuits, of FPGA, PLD, etc. type, and/or application-specific integrated circuits (ASIC), and/or an assembly of discrete electronic components etc. suitable for implementing said communication method.

In other words, the terminal UE includes a set of means configured in software (specific computer program) and/or hardware (FPGA, PLD, ASIC, etc.) to implement said communication method.

Moreover, said terminal UE can occupy a fixed position or else be mobile, the disclosed technology applying interchangeably to one or the other of these configurations. For the remainder of the description, and to simplify the presentation of embodiments of the disclosed technology, it is considered without limitation that said terminal UE occupies a fixed position in the cell CELL.

As described above, the wireless communication system SYS also includes an allocating device D_A, the latter being configured in hardware and software to perform processing used to allocate a frequency resource to the terminal UE from among the set E, by implementing an allocating method according to the disclosed technology. The aspects related to the architecture of said allocating device D_A and to the implementation of said allocating method will be described in more detail further on.

In accordance with the disclosed technology, each cell of the cellular network (and therefore of necessity the cell CELL in which the terminal UE is positioned) is partitioned into a plurality of regions. Said terminal UE is therefore more specifically positioned in such a region R_UE of the cell CELL. Conventionally, each cell/region is associated with an identifier making it possible to distinguish it from the other cells/regions.

Each region of a cell (and therefore of necessity the region R_UE of the cell CELL in which the terminal UE is positioned) is moreover associated with said set E of frequency resources. In this embodiment, this association between a region of a cell and said set E here takes the form of a table (of data) in which are listed all the frequency resources of said set E. Put still otherwise, it is considered that there are, for each cell, as many tables as there are regions partitioning said cell. In practice a table is associated with the identifiers of the region and of the cell to which it relates, such that it is possible to distinguish the tables of the cellular network from one another and to have access to them selectively.

The fact that the entirety of the set E is listed in the table associated with a region of a cell particularly expresses the fact that, within the meaning of the disclosed technology and contrary to what is proposed in the prior art, there is no fixed and definitive restriction (i.e. pre-established program) prohibiting access to a portion of the frequency spectrum as regards the allocation of a frequency resource to the terminal UE. In other words, at any time, all the resources of the set E are accessible (but not necessarily available since potentially already allocated in part to other terminals) for each of the regions of a cell.

The disclosed technology does however make provision, in addition to this access to the whole spectrum, for a learning method making it possible, over time, to prioritize access to certain frequency resources in each region such as to obtain a very good trade-off between spectral efficiency and limitation of interference between adjacent cells of the cellular network, while offering a great ability to adapt to the variation in the number of users in the cells. For this purpose, the resources of the set E listed in a table of a region are respectively associated with (numerical) values intended to be updated in accordance with said learning process, as described hereinafter in more detail.

FIG. 2 schematically represents an example of partitioning of the cell CELL to which the terminal UE belongs.

In the example of FIG. 2, the cell CELL to which said terminal UE belongs is partitioned into two regions, namely a central region CR_2 and a peripheral region ER_2 (the hexagonal abstract shape of the cell is shown in dotted lines, for purely illustrative purposes). Said regions CR_2 and ER_2 are separated by a border defined as being a level line of a carrier-to-noise ratio CNR.

Note that such a partitioning into two concentric regions is similar to that used for implementing the FFR technique.

It should also be observed that a quantity other than a quantity of CNR may be envisioned to define the border of the partitioning between the regions CR_2, ER_2. Thus, by way of entirely non-limiting example, the quantity in question may be one from among: CINR, RSSI, RSRP, RSRQ, etc.

FIG. 3 schematically represents another example of partitioning of the cell CELL to which the terminal EU belongs.

In the example of FIG. 3, the cell CELL to which said terminal UE belongs is partitioned into seven regions comprising a central region CR_7 in contact with each of the six other regions ER1_7, . . . , ER6_7. The border FR_CR_7 of the central region CR_7 is a closed curve defined as being a region of six level lines and substantially shaped like a star (a star having six points). More specifically, each of said six level lines extends facing a cell adjacent to the CELL, between two consecutive points of said star shape, and corresponds to a level line of a signal-to-interference plus noise ratio CINR. Thus, each level line represents the portion of the border FR_CR_7 beyond which a measurement CINR is predominantly influenced either by the cell CELL, or by the adjacent cell located facing said portion, according to which side of said portion the measurement is taken on.

Put still otherwise, each region ERi_7 (i being an integer index between 1 and 6) is representative of an area in which the value of a measurement CINR is dominated by the signals emitted in the adjacent cell covering said region ERi_7.

Finally, the preceding elements make it possible to define the border FR_CR_7 as being a Voronoi curve parameterized by a signal-to-interference plus noise ratio CINR and characterized by the values taken by said ratio CINR relative to the cells adjacent to said cell CELL.

Similarly to that which has been described hereinabove in the case of the example of FIG. 2, a quantity other than a quantity CINR may be envisioned to define the border FR_CR_7. Thus, by way of example without any limitation whatsoever, the quantity in question can be one from among: CNR, RSSI, RSRP, RSRQ, etc.

FIG. 4 illustrates the principle of partitioning of FIG. 3 in a more visually detailed way, limited (for simplification reasons) to a representation comprising said cell CELL along with two adjacent cells CELL_ADJ_1, CELL_ADJ_2. Thus, and as illustrated by FIG. 4, the region ER1_7 (or the region ER2_7) corresponds to the area of intersection between the substantially circular borders of the CELL and CELL_ADJ_1 (or of the cells CELL and CELL_ADJ_2 respectively). In other words, the border portion FR_CR_7 delimiting the region ER1_7 (or the region ER2_7) corresponds to the portion of the border of the adjacent cell CELL_ADJ_1 (or of the adjacent cell CELL_ADJ_2 respectively) included in the cell CELL.

FIG. 5 schematically represents an example of hardware architecture of the allocating device D_A belonging to the system SYS of FIG. 1.

As illustrated by FIG. 5, the allocating device D_A possesses the hardware architecture of a computer. Thus, the allocating device D_A includes, in particular, a processor 1, a random-access memory 2, a read-only memory 3 and a non-volatile memory 4. It moreover includes a communication module 5.

The read-only memory 3 of the allocating device D_A constitutes a recording medium in accordance with the disclosed technology, readable by the processor 1 and on which is recorded a computer program PROG in accordance with the disclosed technology, including instructions for executing steps of the allocating method according to the disclosed technology.

The program PROG defines functional modules of the allocating device D_A, which rely on or control hardware elements 1 to 5 of the allocating device D_A mentioned previously, and which particularly comprise:

- an identifying module MOD_ID configured to identify the cell CELL and the region RUE associated with said terminal UE following the transmission by said terminal UE of a request for allocation of a frequency resource from among said set E, a checking module MOD_VERIF configured to check the availability of at least one frequency resource in the table associated with the cell CELL and with the region RUE identified for the terminal UE, an executing module MOD_EXEC configured to execute, if at least one frequency resource is available in said table, a reinforcement learning algorithm based on the value or values associated with said at least one available frequency resource, said executing module MOD_EXEC including:

- a selecting sub-module SS_MOD_SELEC configured to selecting a frequency resource from among said at least one available frequency resource,
- an obtaining sub-module SS_MOD_OBT configured to obtain a measurement of a determined quantity associated with said terminal UE, said measurement being taken during a communication made by said terminal UE using the selected frequency resource,
- a comparing sub-module SS_MOD_COMP configured to compare the obtained measurement to a given threshold, such as to obtain a comparison result,
- an updating sub-module SS_MOD_UPDATE configured to update, by positive or negative reinforcement, the value associated with the selected frequency resource according to the obtained comparison result, a rejecting module MOD_REJ configured to reject the allocation request in the event of a negative reinforcement or if no frequency resource is available.

The communication module 5 particularly allows the allocating device D_A to communicate with the high-altitude platform HAP as well as with the terminal UE. In particular, the communication module 5 allows the allocating device D_A to receive (directly or indirectly) an allocation request emitted by the terminal UE as well as to transmit to the latter an item of information (such as for example an identifier) relating to the frequency resources selected by the selecting sub-module SS_MOD_SELEC.

Note that, in the context of this disclosed technology, the expression "to obtain a measurement of a determined quantity associated with said terminal UE" in relation to the obtaining sub-module SS_MOD_OBT can take on different meanings, resulting in different exemplary embodiments of said obtaining sub-modules SS_MOD_OBT.

Thus, according to a first example, the obtaining in question refers to the measurement as such of said determined quantity. In this case, it is understood that the obtaining sub-module SS_MOD_OBT is suitably configured to take said measurement. For example the obtaining sub-module SS_MOD_OBT may include a capture line comprising at least one sensor dedicated to the measurement of said quantity, a capture card configured to condition (e.g. amplification and/or filtering) an electrical signal supplied by said sensor, etc. In general, the configuration of such acquisition means is well-known to those skilled in the art, and will therefore not be further detailed here.

Alternatively, according to a second example, the obtaining in question refers to the receiving of the measurement of said determined quantity, after said measurement has been taken by the terminal UE itself. In this case, the obtaining sub-module MOD_OBT is incorporated into the communication module 5 of the allocating device D_A.

In this embodiment, the reinforcement learning algorithm is of Q-learning type.

Note that the fact of considering such a Q-learning algorithm is only one variant implementation of the disclosed technology. Thus, it is possible to envision for the implementation of the disclosed technology any reinforcement algorithm known to those skilled in the art.

For the remainder of the description, it will be considered without any limitation whatsoever that the obtaining sub-module MOD_OBT is incorporated into the communication module 5 in accordance with the second example described hereinabove.

In this embodiment, the quantity being considered for the measurement obtained by the obtaining sub-module SS_MOD_OBT and also for the comparison made by the comparing sub-module SS_MOD_COMP is the signal-to-interference plus noise ratio CINR.

However, the fact of considering a quantity of CINR type is only one choice of implementation of the disclosed technology. Thus, nothing prevents the envisioning of other quantities, such as those described above (CNR, RSSI, RSRP, RSRQ, etc).

Moreover, the threshold used to compare the measurement quantifies the quality of the signal perceived by the terminal UE based on the resources allocated by the allocating device D_A. This threshold is generally expressed in the same unit as the quantity considered for the measurement, for example in dB/dBm in the case of the CINR. In any case, those skilled in the art know how to set such a threshold to qualify the signal perceived by the terminal UE. In addition, nothing prevents envisioning having one and the same threshold for all the regions of a cell, or else at least two regions of a cell being associated with distinct thresholds.

As mentioned hereinabove, each cell of the cellular network is partitioned into a plurality of regions. In the embodiment described here, it is considered without any limitation whatsoever that the partitioning of the cells of the cellular network, and therefore of necessity of the cell CELL in which the terminal UE is located, is made by an entity other than the allocating device D_A (for example by the high-altitude platform HAP). It is moreover considered that the allocating device D_A has knowledge of the partitioning before the implementation of the allocating method (this can for example be a numerical map stored by the allocating device D_A in its non-volatile memory 4), this knowledge resulting from a communication between said other entity and the allocating device D_A (data exchanges implemented, in particular, by the communication means 5).

Having said that, other embodiments can of course be envisioned. For example, one may envision a mode in which the transmission of the partitioning between said other entity and the allocating device D_A is the subject of a step of the allocating method.

It is also possible to envision a mode in which said partitioning is carried out by the allocating device D_A itself. In this case, the allocating device D_A for example includes a partitioning module MOD_PART configured to carry out said partitioning. There again, the carrying out of said partitioning can for example be the subject of a step of the allocating method (in which case the partitioning module is a functional module defined by the program PROG), or else be the subject of a partitioning method implemented prior to the allocating method.

For the remainder of the description, it is also considered without any limitation whatsoever that the allocating device D_A stores (for example in its non-volatile memory 4) the tables and identifiers respectively associated with the cells and regions of the cellular network. Of course, it is also possible to envision that the tables and identifiers are stored elsewhere, for example in one or more databases external to the allocating device D_A and which the latter can access via the communication means 5.

Note that the values contained in the tables, even before the execution of the allocating method as described hereinafter, may for example be the result of an earlier execution of said allocating method. Alternatively, these values may for example be the result of an initialization consisting in a draw of random values, an attribution of null values, etc. In general, the way in which the values contained in the tables are defined before the execution of the allocating method is not a limiting factor of the disclosed technology.

Finally, it is also now considered that the set E includes any frequency resources N, N being an integer number strictly greater than 1, and that the resources of the set E are written CAN_i (i being an integer index between 1 and N).

FIG. 6 shows, in the form of a flow chart, a particular method of implementation of the allocating method according to the disclosed technology as executed by the allocating device D_A of FIG. 5.

In this method of implementation, the values contained in a table associated with a region of a cell (and therefore of necessity of the cell CELL) are independent of the values contained in another table associated with another region of said cell. In other words, the updating of the values of a table is done independently of the values of another table. The way in which the updating of a value is done is described hereinafter.

In general, said method of implementation of the allocating method can be executed for any terminal positioned in a cell of the cellular network, and also independently of the cell in question. It is nonetheless described here for the sole terminal UE of the cell CELL in accordance with the non-limiting assumptions made hereinabove relating to the wireless communication system SYS. It will nonetheless be understood that the steps described hereinafter may be iterated (sequentially and/or in parallel) for a plurality of terminals.

In practice, the execution of said method of implementation is done following the transmission by said terminal UE of a request REQ for allocation of a frequency resource from among said set E. The transmission of this request REQ is related to the fact that the terminal UE wishes to set up a communication (for example with another terminal of the cellular network). Note that this request REQ does not pertain to a given specific resource but addresses any of the resources of the set E.

It is here assumed that this request REQ is made to the high-altitude platform HAP, and that, on receiving this request REQ, the high-altitude platform HAP informs the allocating device D_A of it by relaying the request REQ to this device.

Hence, and as illustrated by FIG. 6, the allocating method includes a step E10 of identifying the cell CELL and the region R_UE associated with said terminal UE. Said step E10 is implemented by the identifying module MOD_ID of the allocating device D_A.

In said method of implementation, said identifying step E10 includes, firstly, the receiving of the request REQ transmitted (relayed) by the high-altitude platform HAP, then a search for the identifiers respectively associated with the cell CELL and with the region R_UE in means for storing the allocating device D_A (as a reminder, it is assumed here that said identifiers are stored by the allocating device D_A).

Of course, the implementation of the identifying step E10 may be different to that described hereinafter if it is assumed that the identifiers of the cell CELL as well as of the region UE are stored by the high-altitude platform HAP (and not by the allocating device D_A) and/or if it is assumed that the request REQ is not relayed to the allocating device D_A.

For example, if the request REQ is relayed to the allocating device D_A and only the high-altitude platform HAP stores the identifiers in question, one may envision that, on receiving the request REQ, the allocating device D_A transmits to said high-altitude platform HAP a request to obtain the identifiers of the cell CELL as well as of the region UE.

According to another example, if the request REQ is not relayed to the allocating device D_A and if only the high-altitude platform HAP stores the identifiers in question, one may envision that the high-altitude platform HAP itself transmits to the allocating device D_A the identifiers of the cell CELL as well as of the region UE.

In general, no limitation is attached to the way in which the allocating device D_A gains knowledge of the identifiers of the cell CELL as well as of the region UE.

The allocating method also includes a step E20 of checking the availability of at least one frequency resource CAN_i in the table TAB associated with the cell CELL and with the region R_UE. Said step E20 is implemented by the checking module MOD_VERIF of the allocating device D_A.

Said step E20 consists in searching through the table TAB and determining whether or not one or more frequency resources CAN_i are available, i.e. not yet allocated to one or more other terminals (the allocating device D_A here keeping in its memory an item of information making it possible to identify the resources already allocated).

If no frequency resource is available in the table TAB during the implementation of the checking step E20, the allocation request REQ is rejected (step E30 implemented by the rejecting module MOD_REJ of the allocating device DA). Note that such a rejection of the allocation request REQ can be likened to a blocking of the user of the terminal UE.

Henceforth the notation will be used according to which the value associated with a frequency resource CAN_i in the table TAB is written VAL[CAN_i].

On the other hand, if at least one frequency resource CAN_i is available in the table TAB, the allocating method includes a step E40 of executing a reinforcement Q-learning algorithm based on the value or values VAL[CAN_i] associated with said at least one available frequency resource CAN_i. Said step E40 is implemented by the executing module MOD_EXEC of the allocating device D_A.

The general implementation of a reinforcement Q-learning algorithm, indicated under the reference "Q-ALGO" in FIG. 6 is known in the field of automated machine learning. Here, however, it is adapted to the context of the allocation of a frequency resource to the terminal UE positioned in the region R_UE of the cell CELL.

It is now assumed that K frequency resources from among the resources CAN_1, . . . , CAN_N are available (K is an integer number between 1 and N), and said K available resources are written CAN_DISP_1, . . . , CAN_DISP_K.

Also, said step E40 includes, firstly, a sub-step E40_1 of selecting a frequency resource from among said resources CAN_DISP_1, . . . , CAN_DISP_K. Said selecting sub-step E40_1 is implemented by the sub-module SS_MOD_SELEC of the allocating device D_A.

The implementation of said selecting sub-step E40_1 is done in accordance with the general principles of reinforcement Q-learning. More particularly, said sub-step E40_1 includes a first test (reference E40_1_1 in FIG. 6) to determine whether the values VAL[CAN_DISP_1], . . . , VAL[CAN_DISP_K] respectively associated with the resources CAN_DISP_1, . . . , CAN_DISP_K in the table TAB are equal to one another or not.

If the answer to the first test is positive, then the selection made by the step E40_1 consists in a random selection of a resource from among the resources CAN_DISP_1, . . . , CAN_DISP_K (reference E40_1_2 in FIG. 6).

If on the other hand the answer to the first test is negative, said sub-step E40_1 includes a second test (reference E40_1_3 in FIG. 6) to determine whether or not there exists, from among the resources CAN_DISP_1, . . . , CAN_DISP_K, several resources, the respective values of which in the table TAB are maximal.

If the answer to the second test is positive, then the selection made by the step E40_1 consists in a random selection of a resource from among the resources, the respective values of which in the table TAB are maximal (reference E40_1_4 in FIG. 6).

If the answer to the second test is negative, said sub-step E40_1 includes a selection (reference E40_1_5 in FIG. 6) of a resource from among the resources CAN_DISP_1, . . . , CAN_DISP_K with a probability E. The fact of making such a probabilistic selection is a conventional approach in the context of the implementation of reinforcement Q-learning, also known as an exploitation-exploration approach or else (an "e-greedy" approach).

Finally, after the sub-step E40_1, a frequency resource has been selected from among the resources CAN_DISP_1, . . . , CAN_DISP_K. This selected resource is written CAN_SELEC and is communicated to the terminal UE by the allocating device D_A (sub-step E40_2 in FIG. 6). The communication of the resource CAN_SELEC to the terminal UE is carried out by means of a message including an item of information representative of said resource CAN_SELEC, such as for example an identifier of the latter, and based on which the terminal UE is capable of determining that the resource that has been allocated to it is said resource CAN_SELEC.

Hence, the step E40 includes a sub-step E40_3 of obtaining (i.e. receiving in this method of implementation) a measurement MES_CINR of a signal-to-interference plus noise ratio CINR associated with the terminal UE, said measurement MES_CINR being taken during a communication made by said terminal UE using the resource CAN_SELEC. Said sub-step E40_3 is implemented by the sub-module SS_MOD_OBT of the allocating device D_A.

Note that the measurement MES_CINR is taken by the terminal UE itself, then transmitted to the high-altitude platform HAP which relays it to the allocating device D_A. Nothing however prevents the envisioning of an alternative implementation in which the measurement MES_CINR is transmitted directly to the allocating device D_A.

This measurement MES_CINR is compared to a given threshold S_CINR during a comparing sub-step E40_4 implemented by the sub-module SS_MOD_COMP of the allocating device D_A. In this way, a comparison result is obtained.

The step E40 henceforth includes a sub-step E40_5 of updating, by positive or negative reinforcement, the value VAL[CAN_SELEC] associated with the selected frequency resource CAN_SELEC according to said comparison result. Said sub-step E40_5 is implemented by the sub-module SS_MOD_UPDATE of the allocating device D_A.

The positive (or negative) reinforcement here corresponds to an increase (or a decrease respectively), in the table TAB, of the numerical value VAL[CAN_SELEC] associated with the frequency resource CAN_SELEC. No limitation is attached to the amplitude of this increase (or decrease respectively).

In practice, given that the quantity considered here for the measurement MES_CINR is a ratio CINR, the positive reinforcement (references "UPD VAL[CAN_SELEC]+" and E40_5_1 in FIG. 6) takes place if the measurement MES_CINR is greater than the threshold S_CINR.

Conversely, if the negative reinforcement (references "UPD VAL[CAN_SELEC]−" and E40_5_2 in FIG. 6) takes place if the measurement MES_CINR is less than the threshold S_CINR.

Note that in the event of a negative reinforcement, in a similar way to that described for step E30, the allocation request REQ is rejected (step E50 implemented by the rejecting module MOD_REJ of the allocating device D_A).

The invention claimed is:

1. A method for allocating a frequency resource to at least one terminal positioned in a region of a cell belonging to a cellular network, said cell being partitioned into a plurality of regions, a same set E of frequency resources being associated with each region of the cell, said method including, following the transmission by said at least one terminal of a request for allocation of a frequency resource from among said set E, steps of:

identifying the cell and the region associated with said at least one terminal, upon a determination that at least one frequency resource is available in a table listing the set E of frequency resources, associated with the cell and with the region identified and comprising values respectively associated with the listed resources, executing a reinforcement learning algorithm based on the at least one value associated with said at least one available frequency resource, said execution including:

selecting a frequency resource from among said at least one available frequency resource, obtaining a measurement of a determined quantity associated with said at least one terminal, said measurement being taken during a communication made by said at least one terminal using the selected frequency resource, updating, by positive or negative reinforcement, the value associated with the selected frequency resource according to a result of a comparison between the obtained measurement and a given threshold, the allocation request being rejected in the event of a negative reinforcement.

2. The method of claim 1, wherein the cell to which said at least one terminal belongs is partitioned into two regions separated by a border defined as a level line of a determined quantity.

3. The method of claim 1, wherein each cell of the cellular network includes six adjacent cells, the cell to which said at least one terminal belongs being partitioned into seven regions comprising a central region in contact with each of the other six regions, the border of said central region being defined as being a Voronoi curve parameterized by a determined quantity and characterized by the values taken by said quantity in relation to the cells adjacent to said cell to which said at least one terminal belongs.

4. The method of claim 1, wherein the quantity relating to the measurement obtained during a communication made by said at least one terminal using the selected frequency resource is one from among:

a carrier-to-noise ratio, a carrier-to-noise plus interference ratio, a power level indicator, and a signal quality indicator.

5. The method of claim 1, wherein the cellular network is generated by:

a high-altitude platform, or a terrestrial mobile site, or a hybrid infrastructure including a non-terrestrial mobile site and a terrestrial mobile site.

6. The method of claim 1, wherein the reinforcement learning algorithm is a reinforcement Q-learning algorithm.

7. A non-transitory, computer readable medium having stored thereon instructions which, when executed by a processor, cause the processor to implement the method of claim 1.

8. A device for allocating a frequency resource to at least one terminal positioned in a region of a cell belonging to a cellular network, said cell being partitioned into a plurality of regions, a same set E of frequency resources being associated with each region of the cell, said device comprising:

an identifying module configured to identify the cell and the region associated with said at least one terminal following the transmission by said at least one terminal of a request for allocation of a frequency resource from among said set E, an executing module configured to execute, if at least one frequency resource is available in a table listing the set E of frequency resources, associated with the cell and with the region identified and comprising values respectively associated with the listed resources, a reinforcement learning algorithm based on the at least one value associated with said at least one available frequency resource, said executing module including:

a selecting sub-module configured to select a frequency resource from among said at least one available frequency resource, an obtaining sub-module configured to obtain a measurement of a determined quantity associated with said at least one terminal, said measurement being taken during a communication made by said at least one terminal using a selected frequency resource, a comparing sub-module configured to compare the obtained measurement to a given threshold to obtain a comparison result, an updating sub-module configured to update, by positive or negative reinforcement, the value associated with the selected frequency resource according to the comparison result obtained, and a rejecting module configured to reject the allocation request in the event of a negative reinforcement or if no frequency resource is available.

9. A wireless communication system comprising:

means for generating a cellular network, at least one terminal positioned in a region of a cell belonging to said cellular network, and the device of claim 8 for allocating a frequency resource to said at least one terminal.

10. The method of claim 2, wherein:

the quantity relating to the measurement obtained during a communication made by said at least one terminal using the selected frequency resource is one from among:

a carrier-to-noise ratio, a carrier-to-noise plus interference ratio, a power level indicator, and a signal quality indicator; and the quantity above which a border is defined is one from among:

a carrier-to-noise ratio, a carrier-to-noise plus interference ratio, a power level indicator, and a signal quality indicator.

11. The method of claim 3, wherein:

the quantity relating to the measurement obtained during a communication made by said at least one terminal using the selected frequency resource is one from among:

a carrier-to-noise ratio, a carrier-to-noise plus interference ratio, a power level indicator, and a signal quality indicator; and the quantity above which a border is defined is one from among:

a carrier-to-noise ratio, a carrier-to-noise plus interference ratio, a power level indicator, and a signal quality indicator.

* * * * *